US011144897B2

(12) United States Patent
Sanders et al.

(10) Patent No.: US 11,144,897 B2
(45) Date of Patent: Oct. 12, 2021

(54) METHODS AND SYSTEMS TO DETECT ITEMS LEFT IN MERCHANDISE CARRIERS

(71) Applicant: ZEBRA TECHNOLOGIES CORPORATION, Lincolnshire, IL (US)

(72) Inventors: Robert Sanders, St. James, NY (US); Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/597,003

(22) Filed: Oct. 9, 2019

(65) Prior Publication Data

US 2021/0110367 A1    Apr. 15, 2021

(51) Int. Cl.
| | |
|---|---|
| *G06Q 20/20* | (2012.01) |
| *G08B 13/196* | (2006.01) |
| *G06K 9/00* | (2006.01) |
| *G06K 7/14* | (2006.01) |
| *G06K 7/10* | (2006.01) |
| *G08B 21/24* | (2006.01) |

(52) U.S. Cl.
CPC ......... *G06Q 20/20* (2013.01); *G06K 7/10881* (2013.01); *G06K 7/1413* (2013.01); *G06K 9/00671* (2013.01); *G08B 13/19691* (2013.01); *G08B 21/24* (2013.01); *G06K 2007/10524* (2013.01)

(58) Field of Classification Search
None
See application file for complete search history.

(56) References Cited

U.S. PATENT DOCUMENTS

| | | | |
|---|---|---|---|
| 10,115,023 B2* | 10/2018 | Kundu | G08B 31/00 |
| 2005/0099296 A1* | 5/2005 | Matsudaira | G08B 1/08 |
| | | | 340/566 |
| 2006/0032914 A1* | 2/2006 | Brewster | A47F 9/045 |
| | | | 235/383 |
| 2010/0059589 A1* | 3/2010 | Goncalves | G06K 5/00 |
| | | | 235/383 |
| 2013/0062409 A1* | 3/2013 | Nahill | G06K 7/1091 |
| | | | 235/439 |
| 2020/0079412 A1* | 3/2020 | Ramanathan | G08B 13/194 |

* cited by examiner

*Primary Examiner* — Eileen M Adams
(74) *Attorney, Agent, or Firm* — Yuri Astvatsaturov (57) ABSTRACT

Methods and systems to detect items left in merchandise carriers are disclosed. A disclosed example system includes: an input device configured to receive an indication that a merchandise carrier is to be empty from at least one of a user or a device communicatively coupled to the input device; an overhead imaging device configured to capture an image of the merchandise carrier at a checkout station in response to the indication; an image processor configured to detect based on the image an obscuration of a portion of the merchandise carrier by the presence of an item in the merchandise carrier, and generate an alert signal when the portion of the merchandise carrier is obscured; and an output device configured to receive the alert signal and provide a notification of the presence of the item in the merchandise carrier.

24 Claims, 3 Drawing Sheets

METHODS AND SYSTEMS TO DETECT ITEMS LEFT IN MERCHANDISE CARRIERS

FIELD OF THE DISCLOSURE

This disclosure relates generally to merchandise carriers, and, more particularly, to methods and systems to detect items left in merchandise carriers.

BACKGROUND OF THE INVENTION

One common cause of inventory shrink in retail is when items aren't taken out of a merchandise carrier (e.g., a cart, a basket, a trolley, etc.) to be scanned at a point of sale (POS) station. For example, items below the top basket or at the bottom of the cart may be forgotten by the customer or not noticed by a sales association and, thus, are not scanned by the sales associate, or taken out of the cart at a self-checkout station. Accordingly, there is a need for solutions that detect and prevent the inadvertent or purposeful loss of inventory (e.g., theft, fraud, etc.).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments

Connecting lines or connectors shown in the various figures presented are intended to represent example functional relationships and/or physical or logical couplings between the various elements. In general, the same reference numbers will be used throughout the drawing(s) and accompanying written description to refer to the same or like parts.

Elements in the figures are illustrated for simplicity and clarity and have not necessarily been drawn to scale. For example, elements may show with only those specific details that are pertinent to understanding aspects of the invention so as not to obscure the disclosure with details that will be readily apparent to those of ordinary skill in the art having the benefit of the description herein. Further, the dimensions of some of the elements in the figures may be exaggerated relative to other elements to help to improve understanding of aspects of the invention.

DETAILED DESCRIPTION

In various aspects of the present disclosure, example methods and systems to detect items left in merchandise carriers (e.g., a cart, a basket, a trolley, etc.) are disclosed. In disclosed examples, overhead images of a merchandise carrier are analyzed to detect whether an item still remains in a merchandise carrier when, for example, a customer or sales associate attempts to complete a transaction, e.g., by initiating payment for items being purchased. For example, items below the top basket, or at the bottom of the merchandise carrier may be forgotten by the customer, not noticed by a sales associate, were placed back in merchandise carrier after scanning, scanned with a handheld scanner while the item remained in the merchandise carrier, etc. Accordingly, items remaining in the merchandise carrier may be inadvertent, unintended, or may be a purposeful loss of inventory (e.g., theft, fraud, etc.), for example. Thus, there is a need to detect when an item remains in the merchandise carrier so that appropriate remediation can be performed, if necessary. For example, the sales associate or a customer can inspect and indicate that the merchandise carrier has been inspected to that ensure all items have been scanned before payment proceeds.

In some examples, a camera is positioned above a merchandise carrier as the merchandise carrier passes through or is at a point of sale (POS) station during (self-)checkout. An image captured by the camera can be compared with the known pattern(s) of the surfaces of the merchandise carrier. In such comparisons, a remaining item is detected when a portion of the image corresponding to a portion of the merchandise carrier does not match any of the known pattern(s). Such a camera system could detect the cart position and orientation by finding the sides of the merchandise carrier using item recognition and/or by detecting fiducial indicia (e.g., indicators) on the merchandise carrier. A system associated with the camera can alert the sales associate, a security associate, a manager, the customer, etc. when an item is detected in the merchandise carrier, thus, providing the sales associate and/or the customer an opportunity to ensure that there are no items in the cart not being paid for before payment proceeds.

A disclosed example system to detect an item left in a merchandise carrier includes: an input device configured to receive an indication that a merchandise carrier is to be empty from at least one of a user or a device communicatively coupled to the input device; an overhead imaging device configured to capture an image of the merchandise carrier at a checkout station in response to the indication; an image processor configured to detect based on the image an obscuration of a portion of the merchandise carrier by the presence of an item in the merchandise carrier, and generate an alert signal when the portion of the merchandise carrier is obscured; and an output device configured to receive the alert signal and provide a notification of the presence of the item in the merchandise carrier.

In some examples, a three-dimensional (3D) camera and/or a time-of-flight (ToF) camera is positioned above a merchandise carrier as the merchandise carrier passes through or is at a POS station during (self-)checkout. Because the heights of the bottom shelf, the bottom of a basket, etc. are known, a system associated with the camera can alert the sales associate, a security associate, a manager, the customer, etc. if anything in the image does not match one of those known heights. Because the camera can see through the bottom of the basket, heights of items as seen through the grid pattern of the bottom of the basket can be used to identify an item below the basket that exceeds the height of the bottom shelf. Such a camera system could detect the merchandise carrier position and orientation by finding the sides of the merchandise carrier and checking for items of differing heights within the rectangular boundary. By alerting the sales associate, a security associate, a manager, the customer, etc. that an item may remain in the merchandise carrier, the sales associate and/or the customer is provided an opportunity to ensure that there are not items in the merchandise carrier not being paid for before payment proceeds.

Another disclosed example system to detect an item left in a merchandise carrier comprising: an input device configured to receive an indication that a merchandise carrier is to be empty from at least one of a user or a device communicatively coupled to the input device; an overhead three-dimensional (3D) imaging device configured to capture an 3D image of the merchandise carrier at a checkout station in response to the indication; an image processor configured to: determine based on the 3D image a first distance to a potential item in the merchandise carrier; determine based on the 3D image a second distance to a portion of the merchandise carrier or a surface on which the merchandise carrier is positioned; detect a presence of the item in the merchandise carrier based on a comparison of the first and second distances; and generate an alert signal when the presence of the item is detected after the indication signals is received; and an output device configured to receive the alert signal and provide a notification of the presence of the item in the merchandise carrier.

Reference will now be made in detail to non-limiting examples, some of which are illustrated in the accompanying drawings.

Figure 1:
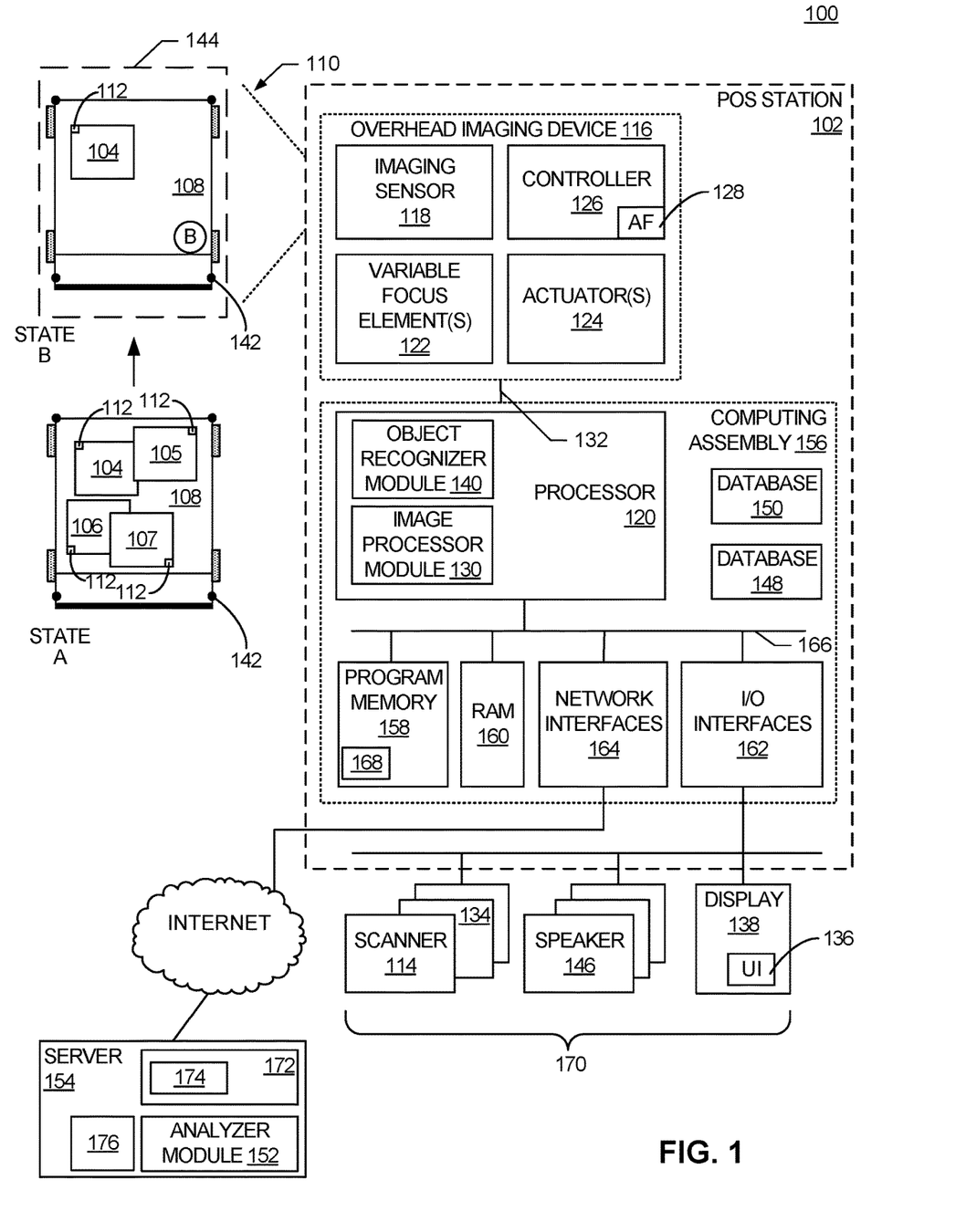
FIG. 1 illustrates a point of sale system to detect items left in merchandise carriers, in accordance with aspects of this disclosure.

FIG. 1 illustrates an example environment 100 in which aspects of this disclosure may be implemented. In the illustrated example of FIG. 1, the environment 100 includes an example POS system 102 where items (four of which are designated at reference numerals 104, 105, 106 and 107) are initially present in an example merchandise carrier 108 (e.g., a cart, a basket, a trolley, etc.) that is moved into and/or through a field of view (FOV) 110 of the POS system 102. The items 104-107 may be, for example, items for purchase, free items, personal items (e.g., a purse), children, circulars, etc. At the POS system 102, barcodes 112 on the items 104-107 for sale are scanned (e.g., using a fixed-location scanner, using a handheld scanner 114, using a radio frequency identification (RFID) tag reader, etc.) and/or have the identifiers on the barcodes 112 manually entered. As the barcodes 112 are scanned and/or entered, the associated items 104-107 are normally removed from the merchandise carrier 108. In FIG. 1 the merchandise carrier is in a first state A prior to commencement of barcode scanning, and in a second state B after all of the items 104-107 have allegedly had their barcodes 112 scanned, however, in state B the item 104 remains in the merchandise carrier 108.

To capture images of the merchandise carrier 108, the example POS system 102 includes an example overhead imaging device 116 having any number and/or type(s) of imaging sensor(s) 118 (e.g., a complementary metal-oxide semiconductor (CMOS) imaging array). The imaging sensor 118 under control of, for example, a processor 120 captures one or more images of the merchandise carrier 108 and transfers the images to the processor 120 for processing. Example overhead imaging devices 116 include a camera, a three-dimensional (3D) camera, a time-of-flight (ToF) camera, etc. In some examples, the overhead imagining device 116 is an off-the-shelf camera.

To focus on the merchandise carrier 108, the example overhead imaging device 116 may include any number and/or type(s) of variable focus element(s) 122 positioned between the imaging sensor 118 and a window, opening, etc. (not shown) of the overhead imaging device 116, and any number and/or type(s) of actuator(s) 124 to activate, operate, etc. the variable focus elements 122 under the control of a controller 126. Example variable focus elements 122 include, but are not limited to, a liquid lens, a voice coil motor, etc. Example actuators 124 include a focusing lens drive, a shift lens drive, a zoom lens drive, an aperture drive, an angular velocity drive, a voice coil motor drive, etc. In some examples, the controller 126 includes an autofocus (AF) module 128 configured to control the actuators 124 to control focus. In some examples, the imaging sensor 118 and/or lens(es) associated with the overhead imaging device 116 are configured with a large enough depth of field and, thus, does not require focusing.

To detect items (e.g., the item 104) left in merchandise carrier 108, the example processor 120 includes an image processor module 130 to analyze images 132 captured by the overhead imaging device 116 to detect whether an item (e.g., item 104) still remains in the merchandise carrier 108 and, thus, obscures a portion of the merchandise carrier 108. In some examples, the detection of a remaining item is performed when a customer or sales associate attempts to complete a transaction, e.g., by initiating payment for scanned items by, for example, pressing a "PAY" button 134 or activates an input aspect of a user interface (UI) 136 presented on a display 138 associated with the POS system 102 and/or another display associated with, for example, a sales associate system. For example, items below a top basket of the merchandise carrier 108 or at the bottom of the basket may be forgotten by a customer, not noticed by a sales associate, placed back in merchandise carrier 108 after scanning (e.g., because it won't fit in a bag), scanned with a handheld scanner while the item remained in the merchandise carrier 108 due to size or weight, etc. Accordingly, items remaining in the merchandise carrier 108 may be inadvertent or unintended, however, they may be indicative of theft, fraud or another purposeful loss of inventory.

In some examples, the overhead imaging device 116 is a conventional camera positioned above the merchandise carrier 108. The image processor module 130 analyzes, compares, etc. overhead images 132 of the merchandise carrier 108 captured by the overhead imaging device 116 to known patterns of the surfaces and members of the merchandise carrier 108. The known patterns may be represented by images taken of an empty merchandise carrier, a mechanical drawing of an empty merchandise carriers, etc. The processor 120 identifies that a portion 202 (see FIG. 2) of an image 204 of the merchandise carrier 108 (e.g., the bottom of a basket) is obscured by the item 104 by comparing the portion 202 with the corresponding portion 206 (see FIG. 2) in another image 208 of the merchandise carrier 108 is empty. The portions 202 and 206 are different because the merchandise carrier 108 includes the item 104. In another example image 210, an item 212 is on the bottom shelf of a merchandise carrier 108 beneath the basket. Accordingly, the image 210 shows the pattern 214 of the bottom of the basket, while blocking the pattern 216 of the bottom shelf. Thus, the processor 120 can identify the item 212 as being on the bottom shelf.

Figure 2:
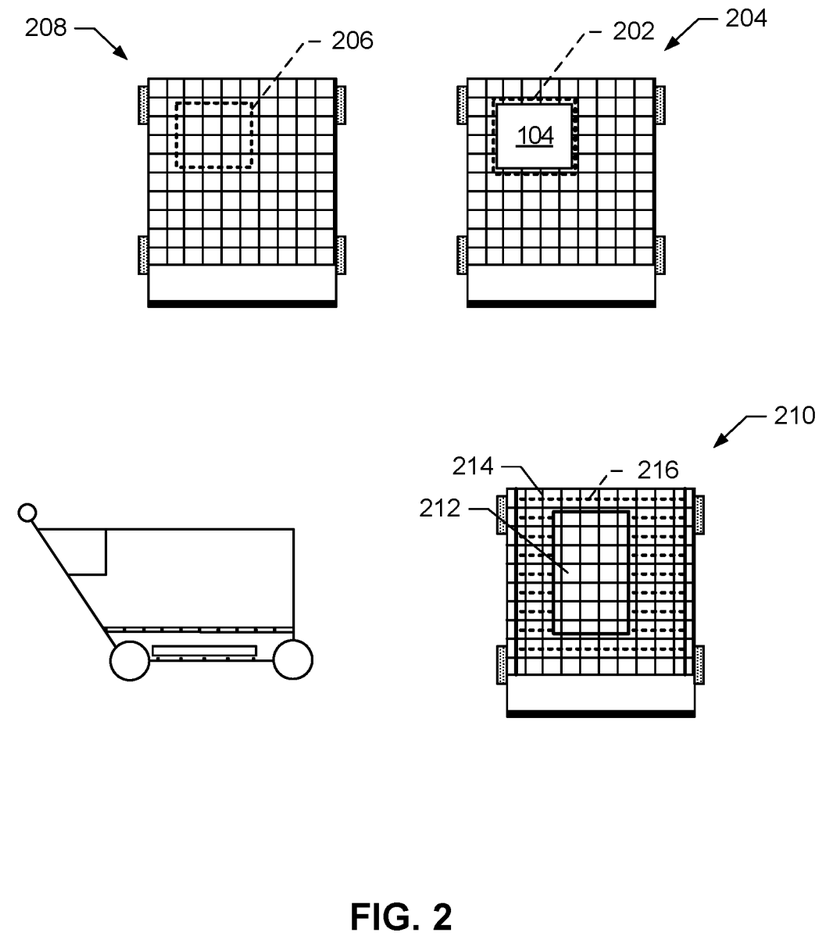
FIG. 2 illustrates example overhead images of a merchandise carrier.

Additionally and/or alternatively, the processor 120 could compare a portion of an image to the known pattern(s) (e.g., a grid pattern of metal rods) of the merchandise carrier 108. When such an obscured portion 202 of the merchandise carrier 108 is identified, the processor 120 flags the merchandise carrier 108 as potentially containing an item that was not scanned and, thus, may not get paid for. Further, the processor 120 can identify whether the pattern of a surface of the merchandise carrier is not continuous but instead changes due to an item 104-107 on the surface blocking the pattern from being seen across all of the surface.

Additionally and/or alternatively, the processor 120 could compare colors in an image to known colors expected to be in an image (e.g., the color(s) of the floor, the color(s) of the merchandise carrier). When an area of color in an image does not match a known color, the area can be considered a potential obscuration. The known colors can be identified during a calibration phase where a merchandise carrier that is known to be empty is placed on intended placement location(s). In some examples, determined boundaries of the merchandise carrier (e.g., based on fiducials) are used to limit the number of known colors that have to be considered, for example, to only those associated with the merchandise carrier itself. To make detection independent of floor color(s), in some examples, only patches of color that are larger than openings in the merchandise carrier and that do not match the cart color(s) are considered as potential obscurations.

In some additional and/or alternative examples, the overhead imaging device 116 is a 3D camera and/or a ToF camera that is positioned above the merchandise carrier 108. In such instances, the overhead imaging device 116 may also include a conventional camera. A first distance from the overhead imaging device 116 to the bottom shelf of the merchandise carrier 108, and a second distance from the overhead imaging device 116 to the bottom of the basket of a merchandise carrier 108 are known a priori. A third distance is from the overhead imaging device 116 to a portion of the merchandise carrier 108 being evaluated. Accordingly, the image processor module 130 can compare the first, second and third distances to detect when an item (e.g., the item 104) still remains in the merchandise carrier 108. For example, when the third distance is less than the second distance, the item is located in the basket. When the bottom of the basket can be seen through and when the third distance is greater than the second distance but less than the first distance, the item is located between the bottom self and the bottom of the merchandise carrier (e.g., on the bottom shelf). The processor 120 can accordingly alert the sales associate, a security associate, a store manager, the customer, etc. when either of these two conditions is satisfied. The image processor module 130 can determine the first, second and third distances from ToF measurements as reflected in the image 132. Alternatively, distances may be considered relative to a surface (e.g., a floor, a shelf, etc.) on which the merchandise carrier 108 is positioned.

In some examples, the overhead imaging device 116 and/or, more generally, the POS station 102 includes both a 3D or ToF camera, and a 2D camera. In such examples, 2D images captured by the 2D camera could be used to perform item, indicia, fiducial, etc. recognition, comparison, etc. that may be difficult with a 3D or ToF camera.

In some examples, the merchandise carrier 108 includes fiducial indicia or markings, one of which is designated at reference numeral 142, that the image processor module 130 can use to identify the location, orientation of the boundaries of the merchandise carrier 108 and, thus, limit item recognition to in, on, etc. the merchandise carrier 108 and/or an area 144 about the merchandise carrier 108.

When an item (e.g., the item 104) that is potentially remaining in, on, etc. the merchandise carrier 108 is identified, then the processor 120 notifies the customer and/or sales associate that an item may still be in the merchandise carrier 108. Example notifications include playing a sound via a speaker 146, via an output aspect of the UI 136, etc. Additionally and/or alternatively, an overhead image 132 of the merchandise carrier 108 can be presented on the display 138 (e.g., in the UI 136) of the POS system 102, a display associated with a sales associate, a display associated with a security associate, a display associated with a store manager, etc. to indicate where the identified remaining item(s) are located. Input aspects of the UI 136 (e.g., touch zones) can be used to clear the alert once the merchandise carrier 108 is inspected for remaining items.

In some examples, an object recognizer module 140 attempts to identify remaining item(s) based on the images(s) 132. For example, object recognizer module 140 compares the image(s) 132 to a database 148 of images of items. If a matching item is found and was scanned at the POS 102 (e.g., using a handheld scanner, scanned and returned to the merchandise carrier 108, etc.), then the processor 120 does not alert the sales associate, a security associate, a store manager, the customer about this item.

In some examples, the object recognizer module 140 attempts to identify remaining item(s) based on the images(s) 132 and/or the image processor module 130 identifies barcodes on the remaining item(s). The processor 120 compares identified items to a database of items sold in a store and, if not found in the database (e.g., the item is not sold in the store), then the processor 120 does not alert the sales associate, a security associate, a store manager, the customer about this item.

In some examples, advertisements (e.g., a weekly ad circular) may be left or placed in a merchandise carrier 108, thereby obstructing a portion of the merchandise carrier 108. Such advertisements may be difficult to detect using ToF or distances data because object recognizer module 140 they are flat and thin. In such examples, the compares portions of the image 132 with portions of the pages of one or more paper advertisements stored in, for example, the database 148. Additionally and/or alternatively, the image processor module 130 can detect the obscuration of the merchandise carrier 108 by an advertisement by detecting indicia on the advertisement. When advertisements are identified, then an alert for these portions of the image 132 can be suppressed.

In some examples, alerts are stored in a database 150 for further analysis. The alerts may be stored in conjunction with the associated sales associate and customer. An analyzer module 152 of a server 154 (e.g., in a main office area in a store) may analyze alert data stored in the database 150 to identify patterns of alerts (e.g., times of day, combinations of sales associate and shopper, more than alerts than for certain shoppers, etc.). In some examples, the analyzer module 152 notifies designated people (e.g., management) of potential fraudulent activity when, for example, a sales associate is currently handling checkout for a particular customer that has generated numerous past alerts. The POS 102 may store alert data locally the database 150 for periodic or aperiodic transfer to the server 154. Additionally and/or alternatively, the POS 102 may send alert data to the server 154 as alerts arise, and the database 150 is implemented at the server 154.

In some examples, the image processor module 130 and/or the object recognizer module 140 include a machine learning module to perform, among other things, pattern matching, item recognition, barcode recognition, indicia recognition, etc.

In the illustrated example of FIG. 1, the POS system 102 includes a computing assembly 156 that includes one or more processors (one of which is the processor 120), program memory 158, random-access memory (RAM) 160, input/output (I/O) interfaces 162, and network interfaces 164, all of which are interconnected via an address/data bus 166. The program memory 158 may store software and/or instructions 168, which may be executed by the processor 120. Different portions of the example POS system 102, for example, the overhead imaging device 116 and the computing assembly 156, may be implemented separately from each other, for example, in different housings. For example, the computing assembly 156 may be implemented at a station where items are scanned, and may have a wired and/or wireless connection with the overhead imaging device 116 implemented at or in a ceiling of a store, possibly hidden from view. However, they may be implemented together and communicatively coupled to a station where items are scanned.

The processor 120 and the controller 126 of the illustrated example may be hardware, and may be semiconductor based (e.g., silicon based) devices. Example processors 120 and controllers 126 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor 120 implements the image processor module 130 and the object recognizer module 140.

The program memory 158 may include any number and/or type(s) of volatile and/or non-volatile storage media or disks storing the software, machine- or computer-readable instructions, or computer- or machine-executable instructions 168. In some examples, the databases 148, 150 are stored in the program memory 158. The software and instructions 168 may be executed by the processor 120 to implement the image processor module 130, and the object recognizer module 140. The software and instructions 168 may be stored on separate non-transitory computer- or machine-readable storage mediums or disks, or at different physical locations.

The program memory 158 and the RAM 160 include any number or type(s) of volatile or non-volatile non-transitory computer- or machine-readable storage media or disks, such as a semiconductor memory, a magnetically readable memory, an optically readable memory, a hard disk drive (HDD), an optical storage drive, a solid-state storage device, a solid-state drive (SSD), a read-only memory (ROM), a RAM, a compact disc (CD), a compact disc read-only memory (CD-ROM), a digital versatile disk (DVD), a Blu-ray disk, a redundant array of independent disks (RAID) system, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

The I/O interfaces 162 may include any number and/or type(s) of different types of I/O circuits or components that enable the processor 120 to communicate with peripheral I/O devices 170 including, in some examples, the overhead imaging device 116. Example I/O interfaces 162 include a universal serial bus (USB), a Bluetooth® interface, a near field communication (NFC) interface, an infrared transceiver, and/or a PCI express interface. The peripheral I/O devices may be any desired type of I/O device such as a keyboard, the display 138 (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), the scanner 114, the speaker 146, a microphone, a printer, the button 134, a communication interface, an antenna, etc.

The computing assembly 156 includes one or more network interfaces 164 for connecting the POS system 102 to the server 154 and/or the overhead imaging device 116 These devices may be connected via any suitable communication means, including wired and/or wireless connectivity components that implement one or more past, present or future industry communication protocol standards like, for example, a TCP/IP interface, a Wi-Fi™ transceiver (according to any of the IEEE 02.11 family of standards), an Ethernet transceiver, a cellular network radio, a satellite network radio, a cable modem, a digital subscriber line (DSL) modem, a dialup modem, or any other suitable communication protocols or standards.

In some embodiments, the overhead imaging device 116 is implemented separately from other parts of the POS system 102 (e.g., separately from the computing assembly 156) and is coupled to the other parts of the POS system 102 (e.g., the computing assembly 156) via the and I/O interfaces 162/or the network interfaces 164. In some embodiments, the computing assembly 156 is implemented in conjunction with the server 154, handles processing for a plurality of checkout stations (e.g., for a plurality of overhead imaging devices 116), etc.

While an example POS system 102 is illustrated in FIG. 1, one or more of the elements, processes and/or devices illustrated in FIG. 1 may be combined, divided, re-arranged, omitted, eliminated and/or implemented in any other way. For example, the processor 120 and the controller 126 may be implemented by the same programmable processor, programmable controller, GPU, DSP, an ASIC, a PLD, an FPGA, an FPLD, etc. Further, the POS system 102 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the server 154 includes, among other things, program memory 172 storing software or instructions 174 that, when executed by a processor 176 of the server 154, cause the server 154 to, among other things, analyze alerts provided by the POS station 102.

In some embodiments, the server 154 (and/or other connected devices) may be located in the same location as the POS system 102. In other embodiments, server 154 (and/or other connected devices) may be located at a remote location, such as on a cloud-platform or other remote location. In still other embodiments, server 154 (and/or other connected devices) may be formed of a combination of local and cloud-based computers.

Figure 3:
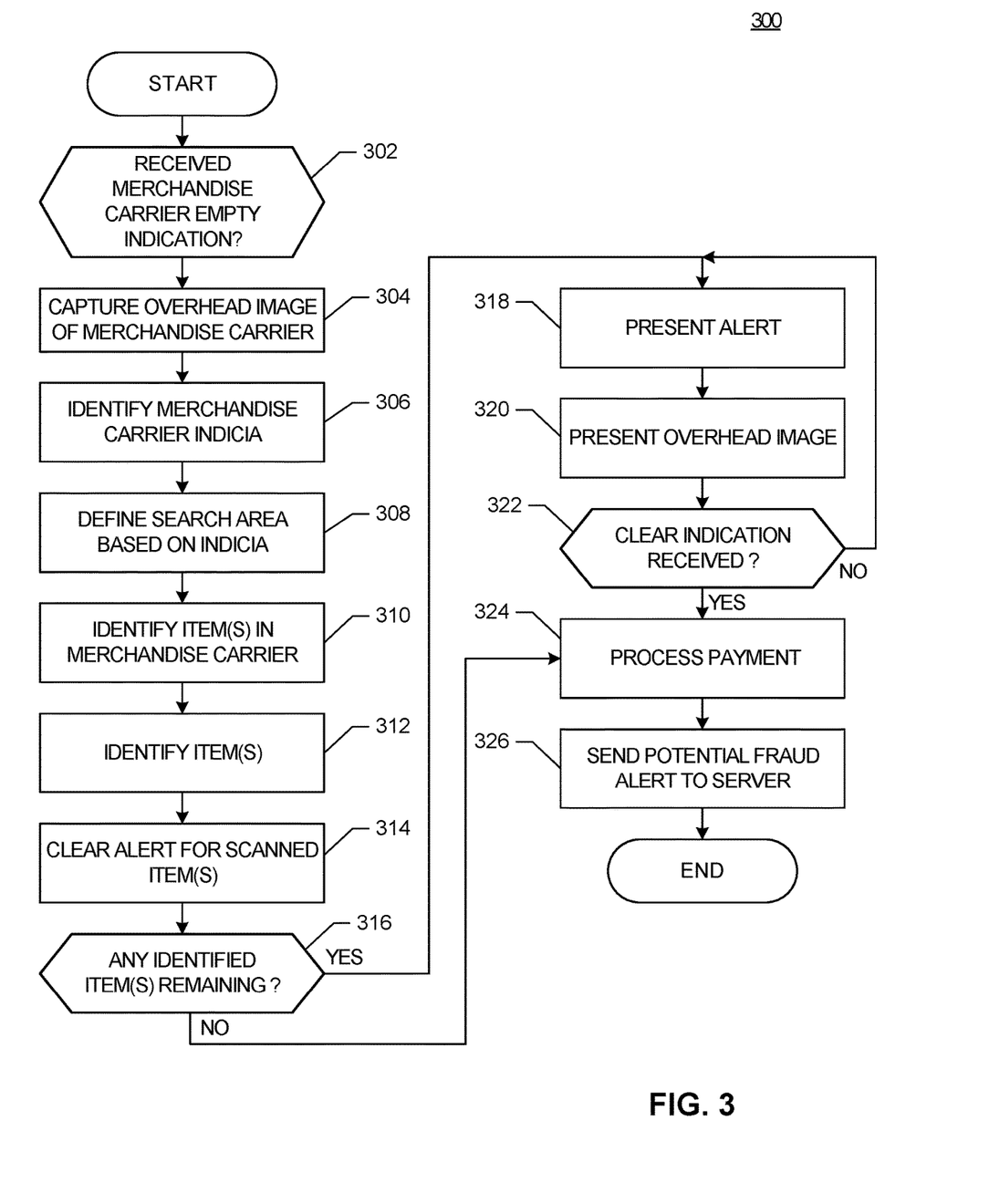
FIG. 3 is a flowchart representative of example method, hardware logic and instructions for implementing the point of sale system of FIG. 1.

A flowchart 300 representative of example processes, methods, software, firmware, and computer- or machine-readable instructions for implementing the POS system 102 of FIG. 1 is shown in FIG. 3. The processes, methods, software and instructions may be an executable program or portion of an executable program for execution by a processor such as the processor 120 and/or the controller 126. The program may be embodied in software or instructions stored on a non-transitory computer- or machine-readable storage medium or disk associated with the processor 120 and/or the controller 126. Further, although the example program is described with reference to the flowchart illustrated in FIG. 3, many other methods of implementing the example POS systems 102 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operations without executing software or firmware. Of course, a combination of the two approaches could be used.

The process of FIG. 3 begins with the processor 120 waiting to receive a merchandise carrier empty indication (block 302) such as a press of the 'PAY' now button 134 or activates an input aspect of the UI 136. The processor 120 controls the overhead imaging device 116 to capture an overhead image 132 (block 304). In some examples, the image processor module 130 searches for merchandise carrier indicia in the image (block 306) and sets a search area for items based on the indicia (block 308).

Based on the overhead image 132 and the search area, the image processor module 130 detects items in the merchandise carrier by (a) comparing portions of the search area with corresponding portions of another image of an empty merchandise carrier or a known pattern, (b) comparing the relative heights of surfaces of the merchandise carrier and heights of potential items in the merchandise carrier, (c) identifying discontinuous patterns in the image, (d) comparing portions of the search area with pages of an advertisement, (e) identify the advertisement by identifying one or more indicia on the advertisement (block 310).

To reduce false alerts, the object recognizer module 140 can (a) compare the image to images in a database of objects for items that are for sale, and/or (b) identify barcodes in the image to recognize items that are for sale (block 312). Identified item(s) that were scanned as part of the current purchase are removed from a list of possible remaining items (block 314).

If any items remain (block 316), an alert for any remaining identified items is presented (block 318). For example a sound is played via the speaker 146 or a message is presented in the UI 136. In some example, an overhead view (e.g., the overhead image 132) is presented, possibly with the location of remaining items highlighted (block 320). When the customer and/or the sales associate clears the alert or indication, confirms that the merchandise carrier has been reviewed, etc. (block 322), the POS system 102 communicates transaction information and awaits confirmation of payment processing (block 324). In some examples, after the confirmation another overhead image is captured and analyzed. In some examples the alert is stored in the database 148 for subsequent processing (block 326). Control then exits from the example program of FIG. 3. In some examples, an alert (e.g., a sound) at block 318 is presented only once, while an overhead image at block 320 is presented continually. The overhead image may be updated periodically or aperiodically.

Returning to block 316, if no items remain (block 316), the POS system 102 communicates transaction information and awaits confirmation of payment processing (block 324).

Example methods and systems to detect items left in merchandise carriers are disclosed herein. Further examples and combinations thereof include at least the following.

Example 1 is a machine vision method comprising: an input device configured to receive an indication that a merchandise carrier is to be empty from at least one of a user or a device communicatively coupled to the input device; an overhead imaging device configured to capture an image of the merchandise carrier at a checkout station in response to the indication; an image processor configured to detect based on the image an obscuration of a portion of the merchandise carrier by the presence of an item in the merchandise carrier, and generate an alert signal when the portion of the merchandise carrier is obscured; and an output device configured to receive the alert signal and provide a notification of the presence of the item in the merchandise carrier.

Example 2 is the system of example 1, further comprising a display at the checkout station configured to present an overhead view of the merchandise carrier when the portion of the merchandise carrier is obscured.

Example 3 is the system of example 1, further comprising a handheld scanner configured to scan barcodes at the checkout station, wherein the image processor is further configured to not generate the alert signal when the handheld scanner at the checkout station was used to scan a barcode.

Example 4 is the system of example 1, wherein the image processor is further configured to: recognize the item in the image; and not generate the alert signal when a barcode for the recognized item was scanned at the checkout station.

Example 5 is the system of example 1, further including a machine-readable storage medium storing a database of item identifiers, wherein the image processor is further configured to: identify the item in the image; compare the identity of the item to the database of item identifiers; and not generate the alert signal when the identified item is not found in the database.

Example 6 is the system of example 1, wherein the image processor is further configured to: compare the image to pages of an advertisement; and not generate the alert signal when a portion of the image matches a portion of a page of the advertisement.

Example 7 is the system of example 6, wherein the image processor is further configured to determine when the image matches the portion of the page of the advertisement by detecting an indicia in the image.

Example 8 is the system of example 1, wherein the input device is configured to receive a clear the alert indication prior to initiating a payment.

Example 9 is the system of example 1, further including: a computer-readable storage medium storing a database representing a history of notifications associated with at least one of sales associates or shoppers; and an analyzer configured to: identify sales associates and/or shoppers that may be associated with potential fraudulent activity based on the history of notifications; and send a fraud alert to a designated person when the potential fraudulent activity is identified.

Example 10 is the system of example 1, wherein the image processor is further configured to use fiducial indicators on the merchandise carrier to detect the merchandise carrier.

Example 11 is the system of example 1, wherein the image processor is further configured to use fiducial indicators on the merchandise carrier to define a region in which the image processor is configured to detect the presence of the item.

Example 12 is the system of example 1, wherein the image is a first image, and wherein the image processor is further configured to detect the obscuration of the portion of the merchandise carrier by the item by comparing the first image with a second image of the portion of the merchandise carrier without an obscuration.

Example 13 is the system of example 1, wherein the image processor is further configured to detect the obscuration of the portion of the merchandise carrier by detecting an obscuration of a portion of a patterned surface on which the merchandise carrier is positioned.

Example 14 is the system of example 1, wherein the image processor is further configured to detect the obscuration of the portion of the merchandise carrier by detecting a color of a portion of the image that does not correspond to one or more known colors associated with the merchandise carrier.

Example 15 is the system of example 14, wherein the image processor is further configured to identify the portion of the image to be within a boundary of the merchandise carrier.

Example 16 is the system of example 14, wherein the image processor is further configured to determine a size of the portion of the image to be larger than a grid portion of the merchandise carrier.

Example 17 is the system of example 14, wherein the one or more known colors include one or more colors of a surface on which the merchandise carrier is present and one or more colors of the merchandise carrier.

Example 18 is a method to detect an item left in a merchandise carrier comprising: receiving an indication that a merchandise carrier is to be empty from at least one of a user or a device communicatively coupled to the input device; capturing an overhead image of the merchandise carrier at a checkout station in response to the indication; detecting based on the image an obscuration of a portion of the merchandise carrier by the presence of an item in the merchandise carrier, and generate an alert signal when the portion of the merchandise carrier is obscured; and receiving the alert signal and provide a notification of the presence of the item in the merchandise carrier.

Example 19 is the method of example 18, further comprising not generating the alert signal when a handheld scanner at the checkout station was used to scan a barcode.

Example 20 is the method of example 18, further comprising: recognizing the item in the image; and not generating the alert signal when a barcode for the recognized item was scanned at the checkout station.

Example 21 is the method of example 18, further comprising: comparing the image to pages of an advertisement; and not generating the alert signal when a portion of the image matches a portion of a page of the advertisement.

Example 22 is the method of example 18, wherein the image is a first image, and further comprising detecting the obscuration of the portion of the merchandise carrier by the item by comparing the first image with a second image of the portion of the merchandise carrier without an obscuration.

Example 23 is the method of example 18, further comprising detecting the obscuration of the portion of the merchandise carrier by detecting a color of a portion of the image that does not correspond to one or more known colors associated with the merchandise carrier.

Example 24 is a non-transitory computer-readable storage medium comprising instructions that, when executed, cause a machine to: receive an indication that a merchandise carrier is to be empty from at least one of a user or a device communicatively coupled to the input device; capture an overhead image of the merchandise carrier at a checkout station in response to the indication; detect based on the image an obscuration of a portion of the merchandise carrier by the presence of an item in the merchandise carrier, and generate an alert signal when the portion of the merchandise carrier is obscured; and receive the alert signal and provide a notification of the presence of the item in the merchandise carrier.

Example 25 is a system to detect an item left in a merchandise carrier comprising: an input device configured to receive an indication that a merchandise carrier is to be empty from at least one of a user or a device communicatively coupled to the input device; an overhead three-dimensional (3D) imaging device configured to capture an 3D image of the merchandise carrier at a checkout station in response to the indication; an image processor configured to: determine based on the 3D image a first distance to a potential item in the merchandise carrier; determine based on the 3D image a second distance to a portion of the merchandise carrier or a surface on which the merchandise carrier is positioned; detect a presence of the item in the merchandise carrier based on a comparison of the first and second distances; and generate an alert signal when the presence of the item is detected after the indication signals is received; and an output device configured to receive the alert signal and provide a notification of the presence of the item in the merchandise carrier.

Example 26 is the system of example 25, further comprising a display at the checkout station configured to present a two-dimensional overhead view of the merchandise carrier when the portion of the merchandise carrier is obscured.

Example 27 is the system of example 25, further comprising a handheld scanner configured to scan items in the merchandise carrier, wherein the image processor is further configured to not generate the alert signal when the handheld scanner at the checkout station was used to scan barcodes in the merchandise carrier.

Example 28 is the system of example 25, further comprising a two-dimensional (2D) imaging device configured to capture a 2D image of the merchandise carrier, wherein the image processor is further configured to: recognize the item in the second image; and not generate the alert signal when a barcode was scanned at the checkout station.

Example 29 is the system of example 25, further comprising a two-dimensional (2D) imaging device configured to capture a 2D image of the merchandise carrier.

Example 30 is the system of example 29, further comprising a machine-readable storage medium storing a database of item identifiers, wherein the image processor is further configured to: identify the item in the 2D image; compare the identity of the item to the database of item identifiers; and not generate the alert signal when the item is not found in the database.

Example 31 is the system of example 29, wherein the image processor is further configured to: compare the 2D image to pages of an advertisement; and not generate the alert signal when a portion of the 2D image matches a portion of a page of the advertisement.

Example 32 is the system of example 25, wherein the portion of the merchandise carrier is a bottom of a basket portion of the merchandise carrier, wherein another portion of the merchandise carrier is a shelf portion of the merchandise carrier below the basket portion, and wherein the image processor is configured to: detect a presence of the item on the shelf portion when the first distance is greater than the second distance, and the second distance is less than a third distance to the surface on which the merchandise carrier is positioned; and detect a presence of the item on the basket portion when the first distance is less than the second distance.

Example 33 is the system of example 25, wherein the image processor is further configured to determine the first distance and the second distance from time-of-flight measurements reflected in the 3D image.

Example 34 is the system of example 25, wherein the input device is configured to receive a clear indication prior to payment being initiated.

Example 35 is the system of example 25, further including: a computer-readable medium storing a database of history notifications associated with at least one of sales associates or shoppers; and an analyzer configured to identify sales associates and/or shoppers that may be associated with potential fraudulent activity based on the history of notifications, and send a fraud alert to a designated person when the potential fraudulent activity is identified.

Example 36 is the system of example 29, wherein the image processor is further configured to use fiducial indicators on the merchandise carrier to detect the merchandise carrier in the 2D image.

Example 37 is the system of example 29, wherein the 2D image is a first 2D image, and wherein the image processor is further configured to detect the obscuration of the portion of the merchandise carrier by the item by comparing the first 2D image and a second 2D image of the portion of the merchandise carrier without an obscuration.

Example 38 is the system of example 29, wherein the image processor is further configured to: compare the 2D image to pages of an advertisement; and not generate the alert signal when a portion of the 2D image matches a portion of a page of the advertisement.

Example 39 is the system of example 38, wherein the image processor is further configured to determine when the portion of 2D image matches the portion of the page of the advertisement by detecting in the 2D image an indicia on the page.

Example 40 is the system of example 25, wherein the image processor is further configured to detect the obscuration of the portion of the merchandise carrier by detecting an obscuration of a portion of a patterned surface on which is merchandise carrier is positioned based on the 3D image or a two-dimensional (2D) image of the merchandise carrier.

Example 41 is a method to detect an item left in a merchandise carrier comprising: receiving an indication that a merchandise carrier is to be empty from at least one of a user or a device communicatively coupled to the input device; capturing an overhead three-dimensional (3D) image of the merchandise carrier at a checkout station in response to the indication; determining based on the 3D image a first distance to a potential item in the merchandise carrier; determining based on the 3D image a second distance to a portion of the merchandise carrier or a surface on which the merchandise carrier is positioned; detecting a presence of the item in the merchandise carrier based on a comparison of the first and second distances; and providing a notification after the indication signal is received when the presence of the item in the merchandise carrier is detected.

Example 42 is the method of example 41, wherein the portion of the merchandise carrier is a bottom of a basket portion of the merchandise carrier, wherein another portion of the merchandise carrier is a shelf portion of the merchandise carrier below the basket portion, and wherein the method further comprises: detecting a presence of the item on the shelf portion when the first distance is greater than the second distance, and the second distance is less than a third distance to the surface on which the merchandise carrier is positioned; and detecting a presence of the item on the basket portion when the first distance is less than the second distance.

Example 43 is the method of example 41, further comprising not generating the alert signal when a handheld scanner at the checkout station was used to scan a barcode.

Example 44 is the method of example 41, further comprising: capturing a two-dimensional (2D) overhead image of the merchandise carrier; recognizing the item in the 2D overhead image; and not generating the alert signal when a barcode for the recognized item was scanned at the checkout station.

Example 45 is the method of example 41, further comprising: capturing a two-dimensional (2D) overhead image of the merchandise carrier; comparing the 2D overhead image to pages of an advertisement; and not generating the alert signal when a portion of the image matches a portion of a page of the advertisement.

Example 46 is the method of example 41, further comprising: capturing a two-dimensional (2D) overhead image of the merchandise carrier; identifying the item in the 2D overhead image; comparing the identity of the item to a database of item identifiers; and not generating the alert signal when the item is not found in the database.

Example 47 is the method of example 41, wherein the image is a first image, and further comprising detecting the obscuration of the portion of the merchandise carrier by the item by comparing the first image with a second image of the portion of the merchandise carrier without an obscuration.

Example 48 is the method of example 41, further comprising detecting the obscuration of the portion of the merchandise carrier by detecting a color of a portion of the image that does not correspond to one or more known colors associated with the merchandise carrier.

Example 49 is a non-transitory computer-readable storage medium comprising instructions that, when executed, cause a machine to: receive an indication that a merchandise carrier is to be empty from at least one of a user or a device communicatively coupled to the input device; capture an overhead three-dimensional (3D) image of the merchandise carrier at a checkout station in response to the indication; determine based on the 3D image a first distance to a potential item in the merchandise carrier; determine based on the 3D image a second distance to a portion of the merchandise carrier or a surface on which the merchandise carrier is positioned; detect a presence of the item in the merchandise carrier based on a comparison of the first and second distances; and provide a notification after the indication signal is received when the presence of the item in the merchandise carrier is detected.

In the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim and/or combinations thereof standing on its own as a separately claimed subject matter.

This patent covers all methods, apparatus and articles of manufacture fairly falling within the scope of the claims of this patent.

What is claimed is:

1. A system to detect an item left in a merchandise carrier, the system comprising:
    an input device configured to receive an indication that a merchandise carrier is to be emptied from at least one of a user or a device communicatively coupled to the input device;
    an overhead imaging device configured to capture an image of the merchandise carrier at a checkout station in response to the indication that the merchandise carrier is to be emptied;
    an image processor configured to detect based on the image an obscuration of a portion of the merchandise carrier by the presence of an item in the merchandise carrier, and generate an alert signal when the portion of the merchandise carrier is obscured; and
    an output device configured to receive the alert signal and provide a notification of the presence of the item in the merchandise carrier.

2. The system of claim 1, further comprising a display at the checkout station configured to present an overhead view of the merchandise carrier when the portion of the merchandise carrier is obscured.

3. The system of claim 1, further comprising a handheld scanner configured to scan barcodes at the checkout station, wherein the image processor is further configured to not generate the alert signal when the handheld scanner at the checkout station was used to scan a barcode.

4. The system of claim 1, wherein the image processor is further configured to:
    recognize the item in the image; and
    not generate the alert signal when a barcode for the recognized item was scanned at the checkout station.

5. The system of claim 1, further including a machine-readable storage medium storing a database of item identifiers, wherein the image processor is further configured to:
    identify the item in the image;
    compare the identity of the item to the database of item identifiers; and
    not generate the alert signal when the identified item is not found in the database.

6. The system of claim 1, wherein the image processor is further configured to:
    compare the image to pages of an advertisement; and
    not generate the alert signal when a portion of the image matches a portion of a page of the advertisement.

7. The system of claim 6, wherein the image processor is further configured to determine when the image matches the portion of the page of the advertisement by detecting an indicia in the image.

8. The system of claim 1, wherein the input device is configured to receive a clear the alert indication prior to initiating a payment.

9. The system of claim 1, further including:
    a computer-readable storage medium storing a database representing a history of notifications associated with at least one of sales associates or shoppers; and
    an analyzer configured to:
        identify sales associates and/or shoppers that may be associated with potential fraudulent activity based on the history of notifications; and
        send a fraud alert to a designated person when the potential fraudulent activity is identified.

10. The system of claim 1, wherein the image processor is further configured to use fiducial indicators on the merchandise carrier to detect the merchandise carrier.

11. The system of claim 1, wherein the image processor is further configured to use fiducial indicators on the merchandise carrier to define a region in which the image processor is configured to detect the presence of the item.

12. The system of claim 1, wherein the image is a first image, and wherein the image processor is further configured to detect the obscuration of the portion of the merchandise carrier by the item by comparing the first image with a second image of the portion of the merchandise carrier without an obscuration.

13. The system of claim 1, wherein the image processor is further configured to detect the obscuration of the portion of the merchandise carrier by detecting an obscuration of a portion of a patterned surface on which the merchandise carrier is positioned.

14. The system of claim 1, wherein the image processor is further configured to detect the obscuration of the portion of the merchandise carrier by detecting a color of a portion of the image that does not correspond to one or more known colors associated with the merchandise carrier.

15. The system of claim 14, wherein the image processor is further configured to identify the portion of the image to be within a boundary of the merchandise carrier.

16. The system of claim 14, wherein the image processor is further configured to determine a size of the portion of the image to be larger than a grid portion of the merchandise carrier.

17. The system of claim 14, wherein the one or more known colors include one or more colors of a surface on which the merchandise carrier is present and one or more colors of the merchandise carrier.

18. A method to detect an item left in a merchandise carrier, the method comprising:
 receiving an indication that a merchandise carrier is to be emptied from at least one of a user or a device communicatively coupled to the input device;
 capturing an overhead image of the merchandise carrier at a checkout station in response to the indication that the merchandise carrier is to be emptied;
 detecting based on the image an obscuration of a portion of the merchandise carrier by the presence of an item in the merchandise carrier, and generate an alert signal when the portion of the merchandise carrier is obscured; and
 receiving the alert signal and provide a notification of the presence of the item in the merchandise carrier.

19. The method of claim 18, further comprising not generating the alert signal when a handheld scanner at the checkout station was used to scan a barcode.

20. The method of claim 18, further comprising:
 recognizing the item in the image; and
 not generating the alert signal when a barcode for the recognized item was scanned at the checkout station.

21. The method of claim 18, further comprising:
 comparing the image to pages of an advertisement; and
 not generating the alert signal when a portion of the image matches a portion of a page of the advertisement.

22. The method of claim 18, wherein the image is a first image, and further comprising detecting the obscuration of the portion of the merchandise carrier by the item by comparing the first image with a second image of the portion of the merchandise carrier without an obscuration.

23. The method of claim 18, further comprising detecting the obscuration of the portion of the merchandise carrier by detecting a color of a portion of the image that does not correspond to one or more known colors associated with the merchandise carrier.

24. A non-transitory computer-readable storage medium comprising instructions that, when executed, cause a machine to:
 receive an indication that a merchandise carrier is to be emptied from at least one of a user or a device communicatively coupled to the input device;
 capture an overhead image of the merchandise carrier at a checkout station in response to the indication that the merchandise carrier is to be emptied;
 detect based on the image an obscuration of a portion of the merchandise carrier by the presence of an item in the merchandise carrier, and generate an alert signal when the portion of the merchandise carrier is obscured; and
 receive the alert signal and provide a notification of the presence of the item in the merchandise carrier.

\* \* \* \* \*